US009250921B2

(12) United States Patent
Lee et al.

(10) Patent No.: US 9,250,921 B2
(45) Date of Patent: Feb. 2, 2016

(54) SELECTION OF A PRIMARY MICROPROCESSOR FOR INITIALIZATION OF A MULTIPROCESSOR SYSTEM

(71) Applicant: International Business Machines Corporation, Armonk, NY (US)

(72) Inventors: Van H. Lee, Cedar Park, TX (US); David D. Sanner, Rochester, MN (US); Thi N. Tran, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 93 days.

(21) Appl. No.: 14/151,119

(22) Filed: Jan. 9, 2014

(65) Prior Publication Data
US 2014/0173251 A1 Jun. 19, 2014

Related U.S. Application Data

(63) Continuation of application No. 13/719,774, filed on Dec. 19, 2012.

(51) Int. Cl.
G06F 9/44 (2006.01)
(52) U.S. Cl.
CPC .................... G06F 9/4405 (2013.01)
(58) Field of Classification Search
CPC ... G06F 9/3885; G06F 9/3851; G06F 9/3824; G06F 9/3836; G06F 9/3891
See application file for complete search history.

(56) References Cited

U.S. PATENT DOCUMENTS

| 5,596,759 | A | 1/1997 | Miller et al. |
| 5,642,506 | A | 6/1997 | Lee |
| 5,867,702 | A | 2/1999 | Lee |
| 6,178,445 | B1 | 1/2001 | Dawkins et al. |
| 7,100,034 | B2 * | 8/2006 | Collins et al. ..................... 713/1 |
| 7,386,711 | B1 | 6/2008 | Haimovsky et al. |
| 7,600,109 | B2 | 10/2009 | Ueltschey, III et al. |
| 7,725,713 | B2 | 5/2010 | Wilson et al. |

(Continued)

FOREIGN PATENT DOCUMENTS

| JP | 06325007 A | 11/1994 |
| KR | 1020050011603 A | 1/2005 |
| KR | 1020080109708 A | 12/2008 |

OTHER PUBLICATIONS

"Multiprocessor Initialization and Verification Method," IBM Technical Disclosure Bulletin, Jan. 1991, Publication-Date: Jan. 1, 1991.*

(Continued)

Primary Examiner — Farley Abad
(74) Attorney, Agent, or Firm — John W. Hayes; William H. Hartwell

(57) ABSTRACT

Embodiments of the present invention provide a method for initializing a plurality of processors of a multi-processor system by executing, at each respective processor of the plurality of processors, at least a portion of local initialization code stored on the respective processor. Receiving, at a designated processor of the plurality of processors, external initialization code stored in external memory, wherein the remainder of the plurality of processors do not have access to the external initialization code stored in external memory. Determining, the designated processor, send at least a portion of the external initialization code to a processor of the remainder of the plurality of processors.

6 Claims, 5 Drawing Sheets

(56) References Cited

U.S. PATENT DOCUMENTS

| | | |
|---|---|---|
| 7,882,333 B2 | 2/2011 | Khatri |
| 8,161,280 B2 | 4/2012 | Wilson et al. |
| 2007/0283137 A1 | 12/2007 | Ueltschey et al. |
| 2009/0119495 A1* | 5/2009 | Khatri ........................ 712/245 |
| 2014/0173250 A1 | 6/2014 | Lee et al. |

OTHER PUBLICATIONS

Lee et al, U.S. Appl. No. 13/719,774, entitled: Selection of a Primary Microprocessor for Initialization of a Multiprocessor System, filed on Dec. 19, 2012.

"Multiprocessor Initialization and Verification Method," IBM Technical Disclosure Bulletin, Jan. 1, 1991.

* cited by examiner

SELECTION OF A PRIMARY MICROPROCESSOR FOR INITIALIZATION OF A MULTIPROCESSOR SYSTEM

CROSS-REFERENCE TO RELATED APPLICATIONS

This application is a continuation of U.S. patent application, Ser. No. 13/719,774 filed on Dec. 19, 2012, the entire content and disclosure of which is incorporated herein by reference.

FIELD OF THE INVENTION

The present invention relates generally to computer systems, and more particularly, to selecting a primary microprocessor for initializing a multiprocessor computer system.

BACKGROUND OF THE INVENTION

Computer systems are designed to process a variety of applications, each comprised of software instructions. With the increasing complexity of applications, software instructions have become longer, thus requiring an increased amount of time for the software instructions to be executed.

Software instructions are executed by a microprocessor which is the key working unit of a computer system. The methods that have been used to increase speed in the personal computer have generally centered on maximizing the efficiency with which a single microprocessor can process instructions. Limits are being reached on single microprocessor processing speed. To address this constraint, multiple microprocessors have been combined to operate in parallel within computer systems. Such multiple microprocessor systems, such as symmetrical multiprocessor (i.e., SMP) systems, allocate processing tasks among the multiple parallel microprocessors.

Upon powering on of an SMP system, each microprocessor is initialized, and a primary microprocessor is selected from among the microprocessors to take charge of bringing up the SMP system. The selection of the primary microprocessor can be done by a software algorithm, or by a hardware locking mechanism. Depending on the number of microprocessors in an SMP system, the time required for initialization increases with the number of microprocessors in the SMP system. The selection of the primary microprocessor can vary upon every time the SMP system is powered on.

SUMMARY

Embodiments of the present invention disclose a method and computer system for initializing a plurality of processors of a multi-processor system, the method comprising the steps of: executing, at each respective processor of the plurality of processors, at least a portion of local initialization code stored on the respective processor; receiving, at a designated processor of the plurality of processors, external initialization code stored in external memory, wherein the remainder of the plurality of processors do not have access to the external initialization code stored in external memory; and determining, the designated processor, send at least a portion of the external initialization code to a processor of the remainder of the plurality of processors.

DETAILED DESCRIPTION

Figure 1:
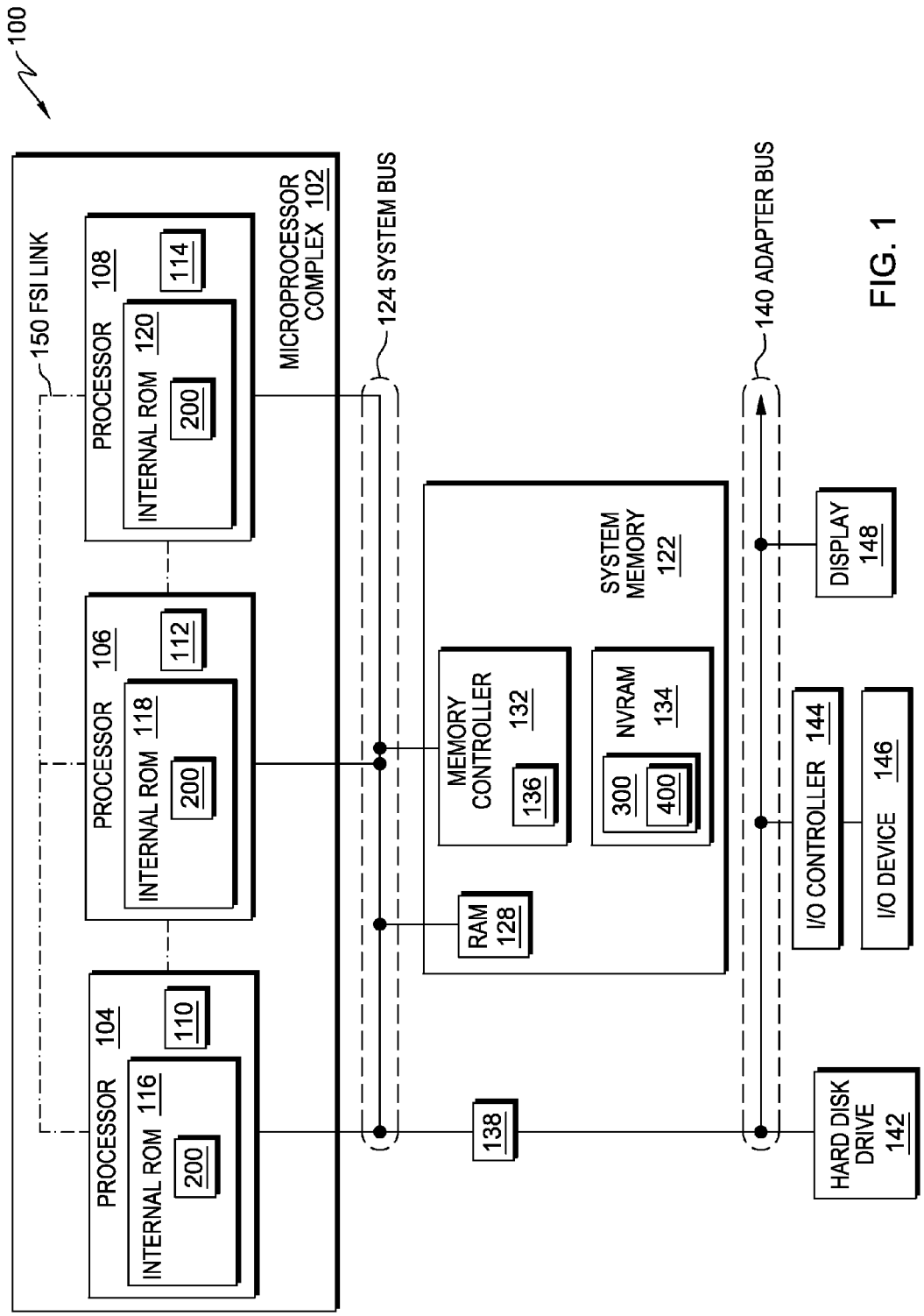
FIG. 1 is a functional block diagram illustrating a data processing system, in accordance with an embodiment of the present invention.

The present invention will now be described in detail with reference to the Figures. FIG. 1 is a functional block diagram illustrating a data processing system, designated 100, in accordance with one embodiment of the present invention.

In one embodiment of the invention, data processing system 100 is an SMP system including main microprocessor complex 102, having processors 104, 106, and 108. It is to be noted that more or fewer processors may be utilized while embodying the present invention. Processors 104, 106, and 108 contain cache 110, 112, and 114 respectively, which are typically found on the same microprocessor chip as the processor. In addition, each of the processors has its own internal ROM 116, 118, and 120 respectively. ROM 116, 118, and 120 each contain internal boot microcode 200 which includes instructions performed by each of processors 104, 106, and 108.

The processors communicate with system memory 122 across a system bus 124. The processors communicate with each other across FRU Support Interface (FSI) link 150. System memory 122 includes a global access memory (RAM) 128, a memory controller 132, and a non-volatile RAM (NVRAM) 134. RAM 128 is used by each of processors 104, 106, and 108 to store data and instructions for later access. The stored content of NVRAM 134 can be modified by processors 104, 106, and 108, and includes external boot microcode 300 with integrated synchronization microcode 400 that is executed by the primary processor which, as described in further detail blow, is selected from among processors 104, 106, and 108 to perform initialization of the other processors. Internal boot microcode 200, external boot microcode 300 and integrated synchronization microcode 400 include processor self-test microcode instructions, microcode instructions for the primary processor to initialize the secondary processors, and microcode instructions for testing and configuring the multiprocessor system as a whole. Memory controller 132 controls some of the operations of RAM 128 and NVRAM 134, and includes several internal registers such as master flag 136.

Also attached to system bus 124, is bus bridge 138 to adapter bus 140. Bus bridge 138 allows multiple devices coupled to adapter bus 140 to communicate with each of the processors and/or system memory access. Coupled to adapter bus 140 is hard disk drive 142 for storing data and instructions, such as an operating system and multiple applications, in a non-volatile environment. INPUT/OUTPUT (I/O) controller 144 is also coupled to adapter bus 140 and is used for handling communications with attached or external I/O devices 146 such as a keyboard, mouse etc. System memory 122 and hard disk drive 142 store data and instructions for processing by multiprocessor complex 102. Display 148 can also be connected to adapter bus 140 for displaying data.

Figure 2:
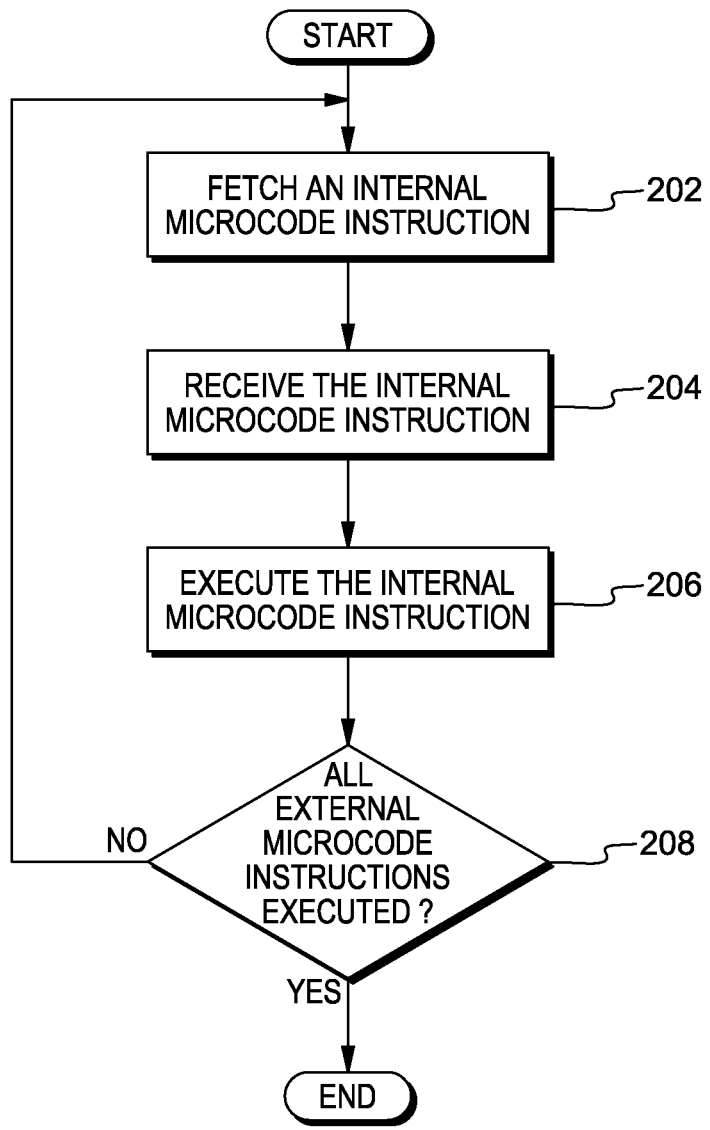
FIG. 2 is a flowchart depicting operational steps for executing internal microcode instructions for microprocessors in an SMP system part of the data processing system, in accordance with an embodiment of the invention.

FIG. 2 is a flowchart depicting operational steps for executing internal microcode instructions for microprocessors in an SMP system, according to an exemplary embodiment of the present invention.

In an exemplary embodiment, processors 104, 106, and 108 receive a request to be initialized and each processor selects internal boot microcode 200 located in ROM 116, 118, and 120 respectively to be executed. Internal boot microcode 200 is a set of internal instructions every processor (i.e., processor 104, 106, and 108) in microprocessor complex 102 performs prior to the synchronization required for operability. The set of instructions prepare processors 104, 106, and 108 for the identification of a primary processor (i.e., processor 104). Internal boot microcode 200 can be dependent on the configuration of the SMP system however; each processor in the SMP system performs the internal microcode instruction.

Processors 104, 106, and 108 each fetch an internal microcode instruction from internal boot microcode 200 (step 202) and receive the internal microcode instruction (step 204). Responsive to receiving the internal microcode instruction, each processor 104, 106 and 108 executes the internal microcode instruction (step 206). Each processor 104, 106, and 108 determines if all internal microcode instructions have been performed (decision 208). Responsive to determining there is another internal microcode instruction to be executed from internal boot microcode 200 (no branch, decision 208), each processor 104, 106, and 108 fetches an internal microcode instruction as previously discussed in step 202. Responsive to determining all internal microcode instructions have been executed (yes branch, decision 208), each processor 104, 106, and 108 ceases fetching instructions from internal boot microcode 200.

Performing internal boot microcode 200 ensures processors 104, 106, and 108 are prepared for the identification of the primary processor and the completion of the initialization process through the synchronization of processors 104, 106, and 108 in the SMP system. As previously mentioned, the instructions of internal boot microcode 200 can be dependent on the configuration of the SMP system in which processor 104, 106, and 108 reside.

Figure 3:
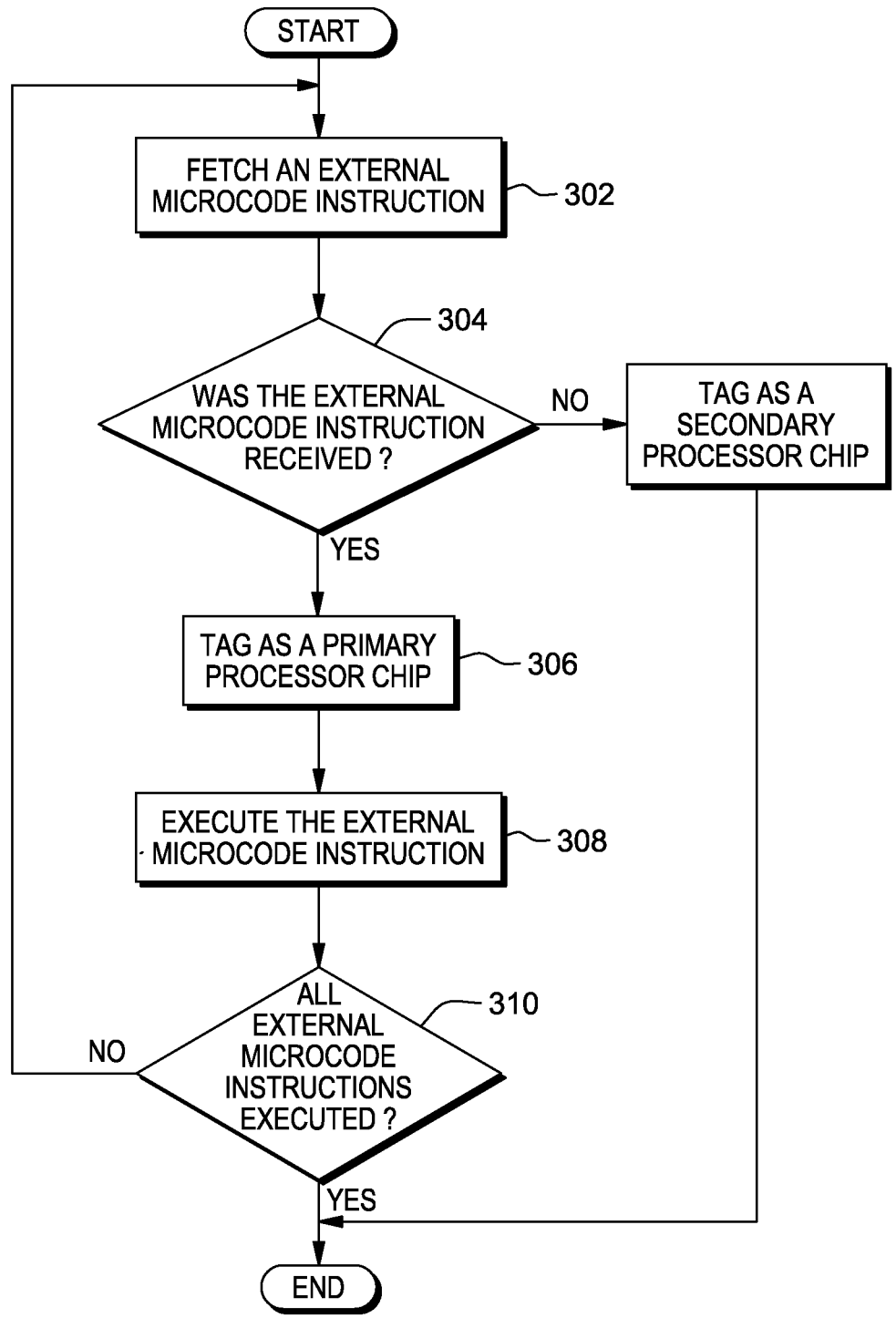
FIG. 3 is a flowchart depicting operational steps for identifying secondary microprocessors and executing external microcode instructions for a primary microprocessor in the SMP system part of the data processing system, in accordance with an embodiment of the invention.

FIG. 3 is a flowchart depicting operational steps for identifying secondary microprocessors and executing external microcode instructions for a primary microprocessor in the SMP system.

In the exemplary embodiment, the hardware connection of each processor to the NVRAM 134 determines the primary microprocessor which will synchronize and control all the other processors (i.e., secondary processors) in microprocessor complex 102. Such a determination is made by having only the primary processor connected to receive instructions of external boot microcode 300 located on NVRAM 134, thus eliminating any additional microcode algorithm needed for determining which one of processors 104, 106, and 108 will be the primary processor. External boot microcode 300 is a set of external instructions sent to the primary processor (i.e., processor 104) that is capable of receiving and executing the set of external instructions. In one embodiment, only the primary processor has its external microcode interface pins connected to NVRAM 134 through which the external microcode instructions can be transferred.

Processor 104, 106, and 108 each attempt to fetch an instruction from external boot microcode 300 through the external microcode interface (step 302). The existence of a connection from NVRAM 134 to any one processor 104, 106, and 108 determines whether the external microcode instruction was received (step 304). Responsive to determining the external microcode instruction was not received (no branch, step 304), the processor enters into an external microcode execution error state, to be subsequently tagged as a secondary processor chip (i.e., processor 106 and 108), and the initialization of the secondary processor chip is placed in a standby mode. Responsive to determining the external microcode instruction was received (yes branch, step 304), the processor enters into an external microcode execution running state, and tags itself as a primary processor chip (i.e., processor 104) (step 306) and processor 104 executes the external microcode instruction (step 308). Processor 104 determines if all external microcode instructions have been performed (step 310). Responsive to determining there is another external microcode instruction to be executed (no branch, step 310), processor 104 fetches an external microcode instruction as previously discussed in step 302. Responsive to determining all external microcode instructions have been executed (yes branch, step 310), processor 104 ceases fetching instructions from external boot microcode 300.

Figure 4:
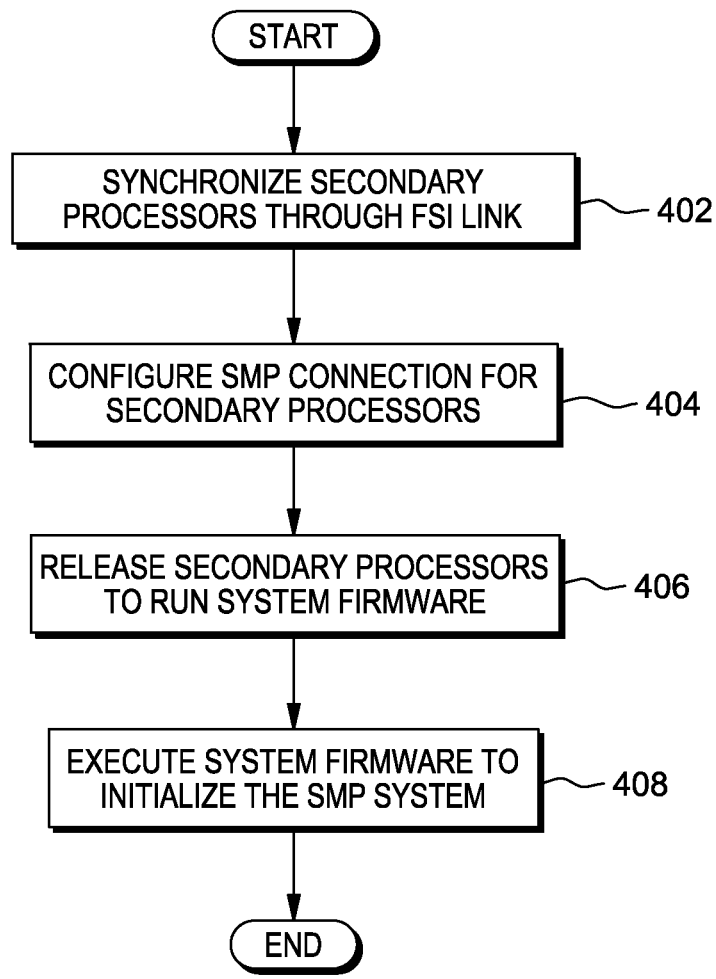
FIG. 4 is a flowchart depicting operational steps for initializing the primary microprocessor and the secondary microprocessors in the data processing system, in accordance with an embodiment of the invention.

FIG. 4 is a flowchart depicting operational steps for synchronizing the primary microprocessor with the secondary microprocessors.

Synchronizing the primary microprocessor with the secondary microprocessor ensures the operability of the SMP system. Synchronization allows for the primary processor to determine the performance capabilities of each secondary processor during operations and distribute application requests among the secondary microprocessors accordingly. The primary processor is able to distribute application requests in a manner that optimizes the performance ability of the SMP system.

In the exemplary embodiment, the primary microprocessor, processor 104 executes the instructions of integrated synchronization microcode 400 which are an integrated set of instructions included with external boot microcode 300, thus resuming processors 106 and 108 previously in standby. Through FSI link 150, processor 104 synchronizes all secondary processors (step 402), e.g., processors 106 and 108, to complete initialization of the SMP system. The synchronization includes the primary processor executing the external microcode designated for the secondary processors, since the secondary processors do not have access to the external microcode instructions. Processor 104 configures the SMP connection for processors 106 and 108 (step 404) within microprocessor complex 102. Processor 104 releases secondary processors 106 and 108 (step 406) and executes system firmware so the SMP system can be initialized (step 408).

The primary processor receiving and executing the external microcode designated for secondary processors accelerates the initialization process due to the rate of which the primary processor can execute the external microcode. The rate at which the primary processor can perform the synchronization through the use of external microcode instructions, relative to the rate of a secondary processor performing a synchronization method known in the art, is greater in comparison.

Figure 5:
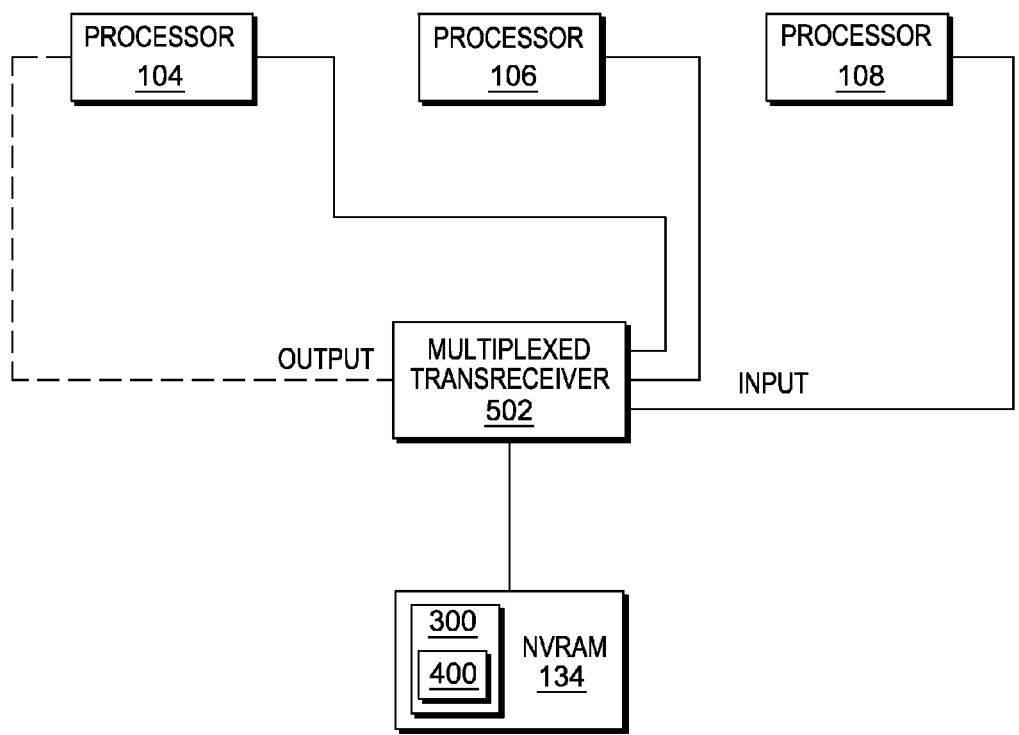
FIG. 5 is a functional block diagram illustrating an example for identifying secondary microprocessors, in accordance with an embodiment of the present invention.

FIG. 5 illustrates a system utilized for identifying secondary microprocessors, in accordance with an embodiment of the present invention.

As depicted, multiplexed transceiver 502 is connected to NVRAM 134 which stores external boot microcode 300 and integrated synchronization microcode 400. Processors 104, 106 and 108 are connected to the input of multiplexed transceiver 502, but only processor 104 is connected to the output of multiplexed transceiver 502. The connection of processor 104 to the output of multiplexed transceiver 502, enables processor 104 to receive external microcode by which processor 104 subsequently designates itself as the primary processor overseeing the secondary processors initialization and operations. Processor 104 is the only processor capable of receiving instructions (i.e., external boot microcode 300 with integrated synchronization microcode 400) and executing the instructions targeted upon processors 106 and 108.

Processor 104 being connected to the output of multiplexed transceiver 502 improves the serviceability of the SMP system. The initialization process can be completed if one or more secondary processors fail since only the primary processor is required to complete the initialization. The primary processor also has the ability to identify which secondary processors failed to be initialized. If the initialization of processor 104, 106, and 108 fails, the primary processor (i.e., processor 104) in charge of the initialization is identifiable and can be replaced to complete the initialization of the secondary processors (i.e., processors 106 and 108). If the initialization fails upon the replacement of the primary processor, the established connection through which external boot microcode 300 is sent, is at fault.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for initializing a plurality of processors of a multi-processor system, the method comprising the steps of:
   executing, at each respective processor of the plurality of processors, at least a portion of local initialization code stored on the respective processor;
   receiving, external initialization code stored in external memory through a designated pin on a designated processor out of the plurality of processors, wherein only through the designated pin of the designated processor is external initialization code capable of being received and the remainder of the plurality of processors do not include the designated pin for receiving external initialization code stored in external memory; and
   determining, by the designated processor, to send at least a portion of the external initialization code to a processor of the remainder of the plurality of processors.

2. The method of claim 1, wherein determining, by the designated processor, to send at least a portion of the external initialization code comprises:
   determining at least the portion of the external initialization code to send to the processor of the remainder of the plurality of processors, from the designated processor; and
   sending the determined portion of the external initialization code to the processor of the remainder of the plurality of processors, from the designated processor.

3. The method of claim 2, further comprising:
   executing, at the processor of the remainder of the plurality of processors, the determined portion of the external initialization code sent from the designated processor.

4. The method of claim 1, wherein at least a portion of local initialization code and at least a portion of external initialization code are utilized.

5. The method of claim 1, further comprising:
   tagging the designated processor as a primary processor, wherein the designated processor is in an external microcode execution running state.

6. The method of claim 1, further comprising:
   tagging each of the remainder of the plurality of processors as a secondary processor, wherein each of the reminder of the plurality of processors is in an external microcode execution error state.

\* \* \* \* \*